(12) United States Patent
Fathi et al.

(10) Patent No.: US 9,460,517 B2
(45) Date of Patent: Oct. 4, 2016

(54) PHOTOGRAMMETRIC METHODS AND DEVICES RELATED THERETO

(71) Applicant: Pointivo, Inc., Atlanta, GA (US)

(72) Inventors: Habib Fathi, Atlanta, GA (US); Daniel L. Ciprari, Atlanta, GA (US)

(73) Assignee: POINTIVO, INC, Atlanta, GA (US)

( * ) Notice: Subject to any disclaimer, the term of this patent is extended or adjusted under 35 U.S.C. 154(b) by 0 days.

(21) Appl. No.: 14/826,104

(22) Filed: Aug. 13, 2015

(65) Prior Publication Data

US 2016/0253814 A1 Sep. 1, 2016

Related U.S. Application Data

(60) Provisional application No. 62/066,925, filed on Oct. 22, 2014.

(51) Int. Cl.
*G06T 17/00* (2006.01)
*G06T 7/00* (2006.01)

(52) U.S. Cl.
CPC .................................. *G06T 7/0051* (2013.01)

(58) Field of Classification Search
None
See application file for complete search history.

(56) References Cited

U.S. PATENT DOCUMENTS

| | | | |
|---|---|---|---|
| 7,003,161 B2 | 2/2006 | Tessadro | |
| 7,457,433 B2 | 11/2008 | Hampapur et al. | |
| 8,078,436 B2 | 12/2011 | Pershing et al. | |
| 8,477,099 B2 | 7/2013 | Webb et al. | |
| 8,547,374 B1* | 10/2013 | Sadjadi | G06T 17/00 345/419 |
| 8,606,011 B1 | 12/2013 | Ivanchenko et al. | |
| 8,655,025 B2 | 2/2014 | Manabe et al. | |
| 8,855,406 B2 | 10/2014 | Lim et al. | |
| 8,885,945 B2 | 11/2014 | Bryll et al. | |
| 8,897,539 B2 | 11/2014 | Stone et al. | |
| 8,953,024 B2 | 2/2015 | Wang et al. | |
| 9,098,773 B2 | 8/2015 | Huang et al. | |
| 2007/0263924 A1* | 11/2007 | Kochi | G01B 11/24 382/154 |
| 2011/0261165 A1 | 10/2011 | Kochi et al. | |
| 2013/0215221 A1 | 8/2013 | Wang et al. | |

(Continued)

FOREIGN PATENT DOCUMENTS

| | | |
|---|---|---|
| CN | 103955939 | 7/2014 |
| EP | 2304688 B1 | 10/2012 |
| WO | WO 2013173383 A1 | 11/2013 |

OTHER PUBLICATIONS

"PCT Search Report/Written Opinion for related PCT/US2015/056752 application, mailed Jan. 12, 2016, 8 pages."

(Continued)

*Primary Examiner* — Stephen R Koziol
*Assistant Examiner* — Delomia L Gilliard
(74) *Attorney, Agent, or Firm* — Thomas | Horstemeyer LLP; Randy R. Schoen

(57) ABSTRACT

The inventions herein relate generally to improvements in photogrammetry and devices suitable for obtaining such improvements. Some embodiments use only a single passive image-capture device to obtain overlapping 2D images, where such images at least partially overlap with regard to at least one object of interest in a scene. Such images can be processed using methods incorporating structure from motion algorithms. Accurate 3D digital representations of the at least one object of interest can be obtained. Substantially accurate measurements and other useful information regarding the at least one object of interest are obtainable from the methodology herein.

17 Claims, 4 Drawing Sheets

(56) References Cited

U.S. PATENT DOCUMENTS

| | | | |
|---|---|---|---|
| 2013/0215239 A1 | 8/2013 | Wang et al. | |
| 2013/0331145 A1* | 12/2013 | Liao | G06T 7/0075 455/556.1 |
| 2014/0184747 A1 | 7/2014 | Valente | |
| 2014/0270480 A1* | 9/2014 | Boardman | G06T 17/00 382/154 |
| 2015/0055085 A1* | 2/2015 | Fonte | G06Q 30/0621 351/178 |
| 2015/0070468 A1* | 3/2015 | Pfeffer | G01B 21/045 348/46 |
| 2015/0172628 A1 | 6/2015 | Brown et al. | |

OTHER PUBLICATIONS

Civera, et al., "Inverse Depth Parametrization for Monocular SLAM", "IEEE Transactions on Robotics", Oct. 2008, pp. 932-945, vol. 24, No. 5.

Engel, et al., "LSD-SLAM: Large-Scale Direct Monocular SLAM", "D. Fleet et al. (Eds.): ECCV 2014, Part II, LNCS 8690", 2014, pp. 834-849.

Kivinen, Jyri J., et al., "Visual boundary prediction: A deep neural prediction network and quality dissection.", "Proc. AISTATS.", 2014.

Leordeanu, et al., "Generalized boundaries from multiple image interpretations.", "IEEE Transactions on Pattern Analysis and Machine Intelligence", 2014, pp. 1312-1324, vol. 36, No. 7.

Lin, et al., "Absolute Depth Estimation from a Single Defocused Image", "IEEE Transactions on Image Processing", Nov. 2013, pp. 4545-4550, vol. 22, No. 11.

Moeller, et al., "Variational Depth from Focus Reconstruction", "Downloaded from: http://arxiv.org/pdf/1408.0173.pdf", Nov. 5, 2014.

Perera, et al., "Integration of Image Data for Refining Building Boundaries Derived from Point Clouds.", "The International Archives of the Photogrammetry, Remote Sensing and Spatial Information Sciences", 2014, pp. 253-258, vol. XL-3.

Snavely, et al., "Modeling the World from Internet Photo Collections", "Int J Comput Vis", 2007, pp. DOI 10.1007/s11263-007-0107-3.

Tanskanen, et al., "Live Metric 3D Reconstruction on Mobile Phones", "Conference: Proceedings of the 2013 IEEE International Conference on Computer Vision", 2013, pp. DOI: 10.1109/ICCV.2013.15.

Tola, et al., "Efficient large-scale multi-view stereo for ultra high-resolution image sets", "Machine Vision and Applications", 2011, pp. DOI 10.1007/s00138-011-0346-8.

Wu, "Towards Linear-time Incremental Structure from Motion", Jun. 2013, Publisher: Joint 3DIM / 3DPVT Conference (3DV)—downloaded from: http://ccwu.me/vsfm/vsfm.pdf.

Zhou, et al., "Coded Aperture Pairs for Depth from Defocus and Defocus Deblurring", "Int J Comput Vis", Dec. 3, 2010, pp. 53-72, vol. 93.

* cited by examiner

PHOTOGRAMMETRIC METHODS AND DEVICES RELATED THERETO

CROSS-REFERENCE TO RELATED APPLICATIONS

This application claims priority to U.S. Provisional Application No. 62/066,925, filed Oct. 22, 2014, entitled "Photogrammetric Methods and Devices Related Thereto," the disclosure of which is incorporated in its entirety by this reference.

FIELD OF THE INVENTION

The inventions herein relate generally to improvements in photogrammetry and devices suitable for obtaining such improvements.

BACKGROUND OF THE INVENTION

Photogrammetry is the science of obtaining measurements from photographs, especially for recovering the exact or nearly-exact positions of surface points. While photogrammetry is emerging as a robust, non-contact technique to obtain measurements of objects, scenes, landscapes, etc., there are limitations to existing methods, some of which, for example, are set forth in the following few paragraphs.

Accurate three-dimensional (3D) digital representations of objects can be obtained using methods that utilize active-sensing techniques, such as systems that emit structured light, laser beams or the like, record images of objects illuminated by the emitted light, and then determine the 3D measurements from the recorded images. A laser scanner is an example of a standalone device that utilizes structured light to generate measurements of objects. When used in mobile devices, such as smartphones and tablets, emission of the structured light used for 2D and 3D image generation can be achieved by including a separate hardware device as a peripheral. This peripheral is configured to emit, for example, structured light to generate a point cloud (or depth map) from which data about the object of interest can be derived using photogrammetric algorithms. Use of such a peripheral device to provide active sensing methods are provided by, for example, Structure Sensor (see the internet URL structure.io), the DPI-8 kit or the DPI-8SR kit products (see the internet URL www.dotproduct3d.com). While often providing accurate image data, it is nonetheless cumbersome for users to have to add a clamp-on or other type of peripheral equipment to their mobile devices. Alternatively, active sensing means can be integrated into mobile devices, such as in Google's Tango® product.

Existing passive photogrammetry methods—that is, methods that do not use structured light, lasers or the like but which, for example, utilize images captured by a camera from which to derive measurements, etc. can also be problematic to use. Conventional stereo/2D or 3D cameras typically obtain two images of an object simultaneously from two viewpoints that are typically separated, for example, by the interpupillary distance (IPD) of a person (which can range from about 52 to about 78 mm according to the 1988 Gordan et al. "Anthropometric Survey of US Army Personnel, Methods and Summary Statistics." TR-89-044. Natick Mass.: U.S. Army Natick Research, Development and Engineering Center). Such stereo images generally have insufficient parallax for high-quality measurement when used to obtain data regarding distant objects (e.g., objects more than a few (about one to about five) meters away from the cameras). To obtain suitable parallax using such methods, the user will be directed to use a template or framework incorporated in, for example, software associated with the image-capture device to guide orientation of the image-capture device relative to the object of interest. This technique can ensure that a sufficient number of appropriately overlapping images of the object of interest are obtained. Alternatively, the user can be provided with general instructions of how to orient the camera and/or object so as to obtain appropriate overlap. Both of these techniques for guiding the user can be used to provide accurate visualization of the object of interest but are nonetheless cumbersome and prone to user error.

It is possible to obtain accurate measurements from photographs by using multiple images of an object of interest. When placed in a 3D context (i.e., "multiple view geometry"), the three-dimensional points from an object of interest can be estimated from measurements from two or more photographic images taken from different positions. Corresponding points are identified on each image. A line of sight (or ray) can be constructed from the camera location to the point on the object. Triangulation allows determination of the 3D location of the point both in relation to the object's orientation in space, as well as with regard to that point's orientation and/or position in relation to other points.

Methods for passive photogrammetry where 3D digital representations of the object(s) of interest can be used to derive measurements and other detail of interest are disclosed in U.S. Pat. No. 8,897,539 titled "Using images to create measurements of structures through the videogrammetric process" and PCT Publication No. WO2013/173383 by Brilakis et al. titled "Methods and apparatus for processing image streams," U.S. Pat. No. 8,855,406 to Lim, et al. titled "Egomotion using assorted features," the disclosures of which are incorporated in their entireties by this reference. Notably, the methodologies disclosed in each of these references require the use of two cameras to capture 2D images from which a 3D digital representation can thereby be obtained.

An example of fairly accurate passive photogrammetry that utilizes multiple images generated from a single camera is provided by Photomodeler (photomodeler.com). This software product allows a user to generate a 3D digital representation of an object of interest from multiple overlapping images, where the relevant detail is provided by the orientation of images in a known area of space. In some implementations, accurate measurements can be obtained from the 3D digital representations of the object(s) of interest. However, Photomodeler requires a user to conduct explicit calibration that occurs in a separate step to achieve such accuracy. Once the 3D orientation is obtained, measurement and other detail information regarding the object of interest can be provided for use. At least part of this calibration step comprises users perform a manual boundary identification. This calibration process is time consuming, currently requiring the user to generate a chessboard marker comprising a minimum number of images taken from different angles and distances with respect to the image-capture device, whereby more images will provide more accurate calibration. Moreover, to measure objects of interest that are longer distances from the camera, accurate measurements of the object of interest require larger calibration surface (e.g., about 6 ft.×about 6 ft. (1.82 meters by 1.82 meters)). As might be recognized, this physical calibration step provides the information necessary to orient the object(s) of interest in space so as to make it possible to provide 3D digital representations of the object(s) of interest thereof so that measurements can be obtained.

Recently issued U.S. Pat. No. 8,953,024, the disclosure of which is incorporated herein in its entirety, indicates that 3D digital models of scenes can be generated using a passive digital video camera using, in one implementation, structure from motion algorithms. Among other things, there is no disclosure in the '024 patent that sufficient detail about individual objects present in the scene can be obtained to allow specific parameters of such objects to be resolved in order to obtain accurate 3D digital representations suitable to provide measurements or the like.

In light of these and other issues, there remains a need for improvements in photogrammetry that allow a user to obtain accurate 3D digital representations of an object of interest (or a collection of objects of interest) without the need for use of two camera image acquisition and/or the use of cumbersome processing steps. Still further, it would be desirable to have method and devices to obtain accurate 3D digital representations of the object(s) using a single image-capture device, such as those integrated into mobile devices (e.g., smart phones, tablets, etc.). Yet further, it would be desirable to be able to obtain substantially accurate measurements of object(s) of interest in a scene. The present invention provides this and other benefits.

SUMMARY OF THE INVENTION

In one embodiment, the invention provides a method for generating 3D digital representations of an object of interest using an image-capture device. An exemplary method comprises receiving a plurality of 2D digital images of a scene, where at least one object of interest is present in the scene. The 2D digital images will at least partially overlap with regard to the object of interest. In order to generate the 3D digital representation of the object of interest, at least some of the 2D digital overlapping images of the object are processed using methodology that incorporates a structure from motion algorithm. The 3D digital representations obtained in accordance with the invention are suitable for generating one or more of a 3D model, a 3D point cloud, a 3D line cloud or a 3D edge cloud, wherein each, independently, corresponds to one or more dimensions in the object. Further, the 3D digital representation, and any data or other information obtainable therefrom, is accurate in relation to the dimensions of the actual object, which allows substantially accurate measurements of one or more dimensions of the object to be obtained.

In a further embodiment, the invention provides a method of detecting boundaries in at least one object of interest in a scene. In this regard, overlapping 2D digital images of an object of interest in a scene are generated. Boundary detection information regarding the object is generated from a process that incorporates a structure from motion algorithm. With respect to the object of interest in the scene, the boundary detection information can be used provide measurements, 3D digital representations, 3D point clouds, 3D line clouds, 3D edge clouds and the like.

The overlapping 2D digital images used in the present invention can be obtained from a single image-capture device. Still further, the single image-capture device is a video camera. The 2D digital images can be generated by an image-capture device that comprises a passive sensing technique. Yet further, the 2D digital images can be generated by an image-capture device that consists essentially of a passive sensing technique. The image-capture devices can be integrated into a device such as a smartphone, tablet or wearable device or the image-capture devices can be as stand-alone camera device. The image-capture device can also be incorporated in a specialized measurement device. Accordingly, the present invention relates to one or more devices that incorporate the methods herein.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

FIG. 3 is a flowchart of a method 301 illustrating an exemplary methodology for use in navigation applications for robots and the like.

DETAILED DESCRIPTION OF THE INVENTION

Figure 1A:
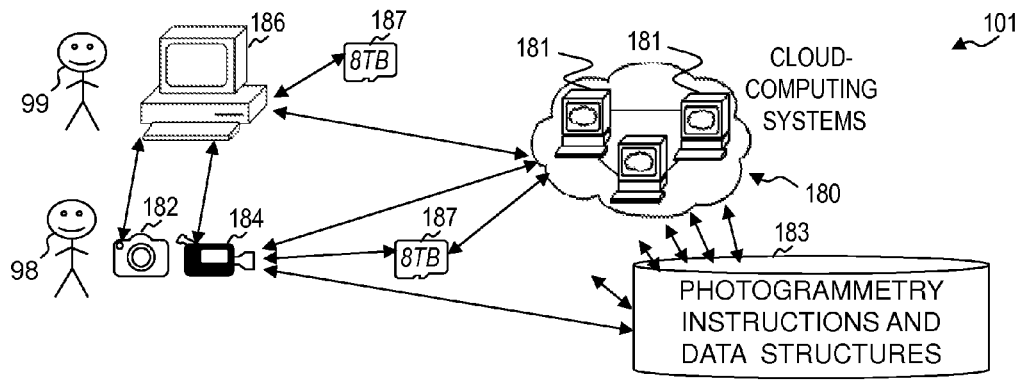
FIG. 1A is a block diagram of a system 101 according to some embodiments of the present invention.

Many aspects of the disclosure can be better understood with reference to the Figures presented herewith. The Figures are intended to illustrate the various features of the present disclosure. Moreover, like references in the drawings designate corresponding parts among the several views. While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

In one embodiment, the invention provides a method for generating 3D digital representations of an object of interest in a scene from an image-capture device. An exemplary method comprises receiving a plurality of 2D digital images of the scene, where at least one object of interest is present in the scene. The 2D digital images will at least partially overlap with regard to the object of interest. In order to generate the 3D digital representation of the object of interest, at least some of the 2D digital overlapping images of the object are processed using methodology that incorporates a structure from motion algorithm. The 3D digital representations obtained in accordance with the invention are suitable for generating one or more of a 3D model, a 3D point cloud, a 3D line cloud or a 3D edge cloud, wherein each, independently, corresponds to one or more dimensions in the object. Further, the 3D digital representations, and any data or other information obtainable therefrom, is accurate in relation to the dimensions of the actual object, which allows accurate measurements of one or more dimensions of the object to be obtained.

As used herein, "overlapping images" means individual images that each, independently, include at least one object of interest, where such images overlap each other as to one or more dimensions of the object of interest are concerned. "Overlapping" in relation to the invention herein is described in further detail hereinbelow.

As used herein, an "object of interest" encompasses a wide variety of objects such as, for example, structures, parts of structures, landscapes, vehicles, people, animals and the like. Indeed, "object of interest" can be anything from which a 2D image can be obtained and that from which information suitable for generation of accurate 3D digital representations of such objects can be obtained according to the methodology herein. The at least one object of interest can have multiple dimensions, such as linear or spatial dimensions, some or all of which may be of interest, such as to provide measurements or other useful information. Further, the methodology herein can be utilized to generate accurate 3D digital representations of more than one object of interest in a scene, such as a collection of smaller objects (e.g., doors, windows, etc.) associated with a larger object (e.g., the overall dimensions of a building) where such collection of smaller and larger objects are present in the plurality of overlapping 2D images in a scene.

The at least one object of interest, for example, can be a roof on a structure that is present in a scene that includes the structure, landscaping and other objects. The length of the roof on a front side of the structure (such as in meters or feet, etc.) could be at least one dimension of interest. Alternatively, each of the dimensions of the roof (such as length on the back, front and sides of the structure and the pitch) could comprise a plurality of dimensions of interest. As would be recognized, these one or plurality of dimensions/features will have an actual measurement value that will be obtainable when a physical measurement of the length, depth, etc., is conducted, such as by a linear measurement tool or an electronic distance measurement tool.

The overlapping 2D digital images used in the present invention can be obtained from a single image-capture device. Still further, the single image-capture device is a video camera. The 2D digital images can be generated by an image-capture device that comprises a passive sensing technique. Yet further, the 2D digital images can be generated by an image-capture device that consists essentially of a passive sensing technique. The image-capture devices can be integrated into a device such as a smartphone, tablet or wearable device or the image-capture devices can be as stand-alone camera device. The image-capture device can also be incorporated in a specialized measurement device. Accordingly, the present invention relates to one or more devices that incorporate the methods herein.

In accordance with the methods herein, an extracted measurement value of the one or a plurality of dimensions in the object of interest and other useful information, such as boundary detection information as discussed herein below, can be obtained from using a single passive image-capture device, such as that integrated into a smartphone, tablet, wearable device, digital camera (for example, digital cameras on drones) or the like.

When the plurality of overlapping 2D images are derived from a video-image-capture device, the images will be overlapping. As used herein, "video" means generally that the images are taken, for example, as single frames in quick succession for playback to provide the illusion of motion to a viewer. In some aspects, video suitable for use in the present invention comprises at least about 24 frames per second ("fps"), or at least about 28 fps or at least about 30 fps (frames per second) or any suitable fps as appropriate in a specific context.

As used herein, "image-capture-device calibration" is the process of determining internal image-capture-device parameters (e.g., focal length, skew, principal point, and lens distortion) from a plurality of images taken of an object with known dimensions (e.g., a planar surface with a chessboard pattern). Image-capture-device calibration is used for relating image-capture device measurements with measurements in the real "3D" world. Objects in the real world are not only three-dimensional, they are also physical spaces with physical units. Hence, the relation between the image-capture device's natural units (pixels) and the units of the physical world (e.g., meters) can be a significant component in any attempt to reconstruct a 3D scene and/or an object incorporated therein. A "calibrated image-capture device" is an image-capture device that has undergone a calibration process. Similarly, an "uncalibrated image-capture device" is an image-capture device that has not been put through a calibration process, in that no information or substantially no information regarding the internal image-capture device parameters is provided and substantially the only available information about the images is presented in the image/video frame itself. In some embodiments, the present invention incorporates a calibrated image-capture device. In other embodiments, the present invention incorporates an uncalibrated image-capture device. In some embodiments, the present invention extracts metadata (such as EXIF tags) that includes camera-lens data, focal length data, time data, and/or GPS data, and uses that additional data to further process the images into point-edge-cloud data.

In accordance with some aspects of the invention herein, use of a plurality of 2D overlapping images derived from video greatly improves the ease and quality of user capture of the plurality of 2D images that can be processed to provide accurate 3D digital representations of the at least one object of interest, for example, such as to generate substantially accurate measurements of the object. As one example of this improvement, the sequential nature of video has been found by the inventors herein to improve 3D digital representation quality due to an attendant reduction in the errors associated with a user needing to obtain proper overlap of the plurality of overlapping 2D images so that detailed information about the object of interest can be derived. Another advantage of the present invention is the shortened time needed to obtain the overlapping 2D images used in the present invention to create detailed information about the object of interest such that an accurate 3D digital representation can be obtained for use. Still further, the inventors herein have found that use of video as the source of the plurality of overlapping 2D images can allow tracking of points that are inside (i.e., tracking points within the boundaries of the images) or outside of the images of the object of interest (i.e., continuing to track points that are first "followed" when in the image frame, and then tracking estimated positions of those points no longer in the images intermediate in time (the points have moved outside the boundaries of the images), so that when those points are in the field of view of later image frames, the later-followed points can be substantially correlated to those same features in the earlier image frames), where such point tracking provides improvements in the 2D-image data used to generate the 3D digital representations the at least one object of interest in a scene. In turn, it has been found that the quality of the 3D digital representations of the object(s) of interest herein can be improved.

While the present invention is particularly suitable for use with image-capture devices that generate a video from which overlapping 2D images can be provided, the present invention is not limited to the use of video. That is, the plurality of overlapping 2D images can suitably be provided by an image-capture device that provides 2D still images, such as a "point and shoot" digital camera. When using a such a digital still camera, the at least two overlapping images can be obtained from images that comprise a suitable parallax between and amongst the images to allow generation of information from which an accurate 3D digital representations of the object(s) can be obtained.

As would be recognized, a plurality of still 2D images taken in sequence can also be defined as "video" if played back at a speed that allows the perception of motion. Therefore, in some aspects, the plurality of overlapping 2D images can be derived from a plurality of digital still images and/or from video without affecting the substance of the present invention, as long as the plurality of overlapping 2D images that include an object of interest can be suitably processed to generate detailed information from which the accurate 3D digital representations of the object(s) of interest can be generated.

The overlapping 2D images of a scene will include at least a portion of the at least one object of interest. In accordance with the invention, at least a portion of the overlapping 2D images of the scene will also be overlapping with regard to the at least one object of interest.

In some aspects, the plurality of overlapping 2D images includes at least two (2) suitably overlapping 2D images, where the overlap is in relation to the at least one object of interest. In other embodiments, the plurality of overlapping 2D images includes at least 5, at least 10, or at least 15 or at least 20 suitably overlapping 2D images, where the overlap is in relation to the at least one object of interest. As would be recognized, the number of overlapping 2D images needed to generate an accurate 3D digital representations of the object(s) of interest in a scene will depend, in part, on factors such as the size, texture, illumination and potential occlusions of the object of interest, as well as the distance of the object of interest from the image-capture device.

As noted, sequential images extracted from video will possess overlap. The overlap present in sequential images generated from video will depend, in part, on the speed at which the user moves the image-capture device around the at least one object of interest and the orientation of the image-capture device in space with reference to the object of interest.

When the image-capture device is a still digital camera, the 2D images can be made suitably overlapping with regard to the at least one object of interest using one or more methods known to one of ordinary skill in the art, such as, in some embodiments, the camera operator taking the successive still images including the at least one object of interest while changing the angular orientation, the linear location, the distance, or a combination thereof in a manner that has the object of interest in each successive image captured. In this regard, the plurality of overlapping 2D images are suitably processable to allow accurate 3D digital representations of the at least one object of interest to be derived therefrom.

To provide suitably overlapping 2D images incorporating the at least one object of interest from sources other than video, the individual images can be overlapped, where such overlap is, in reference to the at least one object of interest, at least about 50% or at least about 60% or at least about 70% or at least about 80% or at least about 90%. In some embodiments, the amount of overlap in the individual images in the plurality of overlapping 2D images, as well as the total number of images needed to provide an accurate digital representation of the object of interest, will also depend, in part, on the relevant features of the object(s). In some embodiments, such relevant features include, for example, the amount of randomness in the object shape, the texture of and size of the at least one object of interest relative to the image-capture device, as well as the complexity and other features of the overall scene.

In a further aspect, the present invention comprises image-capture devices comprising passive sensing techniques and methods relating thereto utilizing a plurality of overlapping 2D images suitable for generating accurate 3D digital representations the at least one object of interest in a scene. The inventors herein have found that accurate 3D digital representations of the object(s) present in a scene can be obtained using a plurality of overlapping 2D images incorporating the object(s) substantially without the use of an active sensor/signal source, such as a laser scanner or the like. As would be understood by one of ordinary skill in the art, "passive-image-capture devices" means that substantially no active signal source such as a laser or structured light (as opposed to camera flash or general-illumination devices) or sound or other reflective or responsive signal is utilized to measure or otherwise sense at least one object of interest so as to provide the information needed to generate the accurate 3D digital representations of the at least one object of interest present in a scene.

As used herein, "accurate" in relation to the 3D digital representations of the at least one object of interest comprises, in part, data or other information from which substantially accurate measurements of the object(s) can be obtained as defined elsewhere herein.

In some embodiments, the present invention further includes passive photogrammetry techniques where the images are obtained from a single image-capture device. Yet further, in some embodiments, no more than one passive image-capture device is used in accordance with the methods herein. This use of images from only a single image-capture device is in contrast to the traditional use of at least two cameras or one or more projectors used to obtain 3D digital representations of the at least one object of interest passive sensing methods as disclosed, for example, in US Patent Publication No. US2013/0083990 and PCT Publication No. WO2013/173383, which are each incorporated by reference as set forth previously. In particular, and as would be recognized by one of ordinary skill in the art, prior-art passive image-capture devices used to generate 3D digital representations of the at least one object of interest utilize at least two cameras (or projectors) displaced in a direction away from one another (e.g., horizontally) so as to obtain at least two differing views of a scene and any objects included therein. By comparing these at-least-two images obtained from two image-capture devices, the relative depth information of the scene and/or objects present therein can be obtained for display to a viewer with or without processing of the image there between.

Yet further, prior art methods perform poorly if the motion between two frames is too small or limited. In contrast, the methodology herein leverages such small or limited motions and creates improved results such situations.

In further embodiments, the present invention includes methods of using mobile devices configured with passive image-acquisition capability suitable to provide accurate 3D digital representations of the at least one object of interest in a scene. In some embodiments, the methodology herein can be utilized to provide measurements and other useful information regarding the object(s). Yet further, the present invention includes methods of using mobile devices configured with passive image-acquisition technology, whereby substantially accurate measurements of one or more dimensions of the objects can be obtained.

In some embodiments, point clouds that incorporate information regarding the at least one object of interest are generated using conventional methods. As used herein, a "point cloud" is a set of data points in the same coordinate system. In a three-dimensional coordinate system, these points are usually defined by X, Y, and Z coordinates. In other embodiments, the inventors herein have found that inventive point clouds can be obtained, where such inventive point clouds further include additional data representative of edge information in the object of interest. Yet further, one or more of point clouds, edge clouds and line clouds are obtainable according to the methodology herein, wherein each of these aspects can include data or other information from which measurements or other useful information about the at least one object of interest can be generated. "Edge cloud" is a set of edge points in the same coordinate system and represented by X, Y, and Z and comprise one or more discontinuities in depth, surface, orientation, reflection, or illumination. "Line cloud" is a set of 3D straight lines in the same coordinate system. Each line can be defined using its two end points or Plucker coordinates.

Unlike prior art methodologies that utilize point-level data to generate 3D digital representations, in some aspects, the present invention can, in some circumstances, be characterized as "hybrid" in nature in that it is possible to utilize any combination of points, edges, and lines (point+edge+line, point+edge, point+line, edge+line, etc.). As a result, while the prior art can only produce point clouds, with the invention herein it is possible to create point clouds, line clouds, and edge clouds and any combination thereof. Moreover, the prior art solutions only produce a point cloud with an unknown scale. Therefore, 3D measurements cannot be extracted directly from the point cloud. The point cloud has to be scaled first. In the present invention, 3D measurements can, in some embodiments, be extracted directly from the point cloud, line cloud and/or edge cloud data substantially without the need for a scaling step.

In another aspect, the accurate 3D digital representations of the at least one object of interest are generated by processing overlapping 2D-image data generated from one or more discontinuities in depth, surface, orientation, reflection, or illumination, wherein such image data is derived from a plurality of overlapping 2D images of an object of interest.

In one aspect, a suitable methodology (albeit where two image-capture devices are required to provide dimensions of the object of interest) that can be used for structure recovery is described in US Patent Publication No. 2013/0083990, previously incorporated by reference.

The methodology herein, in some aspects, utilizes data or other information extracted from a plurality of overlapping 2D images to create a robust data set for image processing wherein a plurality of lines, edges and points included therein are specific to lines, edges and points corresponding to the at least one object of interest as incorporated in the plurality of 2D overlapping images of the object. In some contexts, it has been found that the inventive methodology can provide one or more of the following improvements over the prior art: 1) the edge-detection method substantially filters out useless data, noise, and frequencies while preserving the important structural properties of the at least one object of interest; 2) the amount of data needed to provide an accurate 3D digital representation of an object is reduced, as is the need for attendant data processing; and 3) the necessary information needed for object detection and segmentation (i.e., object boundaries) is provided which is an unmet need in Building Information Modeling (BIM). As used herein, "BIM" means an object-oriented building-development tool that utilizes modeling concepts, information technology and software interoperability to design, construct and operate a building project, as well as communicate its details. Further improvements are found in the present invention are found from the substantially simultaneous processing of point, line and edge data. Prior art solutions only produce a dense 3D point cloud at the beginning, and in a successive step they extract edge points from the generated 3D dense point cloud.

In some embodiments, the 2D digital images suitable for use in the present invention may be missing some or all of the information stored in EXIF tags. This can allow images other than JPEG images to be used as input data in the present invention.

In a further embodiment, the invention provides a method of detecting boundaries in an object of interest in a scene. In this regard, overlapping 2D digital images of an object in a scene are generated. Boundary detection information regarding the object is generated from a process that incorporates a structure from motion algorithm. With respect to the at least one object of interest in the scene, the boundary detection information can be used to generate measurements, 3D digital representations, 3D point clouds, 3D line clouds, 3D edge clouds and the like.

A "boundary" is a contour in the image plane that represents a change in pixel ownership from one object surface to another. "Boundary pixels" mark the transition from one relatively constant region to another, where the constant region can comprise one or more of an object of interest or a scene in which the object appears in the image. Boundary detection is a computer vision problem with broad applicability in areas such as feature extraction, contour grouping, symmetry detection, segmentation of image regions, object recognition, categorization and the like. Detecting boundaries is significantly different from simple edge detection, where "edge detection" is a low level technique to detect an abrupt change in some image feature, such as brightness or color. In contrast, boundary detection relates to the detection of more global properties, such as texture and, therefore, involves integration of information across an image. So, for example, a heavily textured region might give rise to many edges, but to suitably provide information suitable to generate a 3D digital representation of an object of interest therefrom, there should be substantially no boundary defined within the textured region. Moreover, accurate boundary detection is needed to resolve discontinuities in depth that allow accurate rendering of 3D digital representations.

In some embodiments, information needed to generate accurate 3D digital representations of the at least one object of interest in a scene can be determined using a "structure from motion" algorithm. As would be recognized, a structure from motion algorithm can be used to extract 3D geometry information from a plurality of overlapping images of an object or a scene. In accordance with the present invention, information needed to provide accurate 3D digital representations of the object(s) of interest of the object can be generated from a process that incorporates a structure from motion algorithm that estimates camera positions for each image frame in the plurality of overlapping images. As would be recognized, many structure from motion algorithms incorporate key-point detection and matching, so as to form consistent matching tracks and allowing the solving for camera parameters.

The inventors herein have developed improvements in the ability to analyze the plurality of 2D overlapping images of at least one object of interest, where such improvements, in some embodiments, assist in the generation of 3D digital representations of the object. In this regard, an inventive methodology comprises parameterizing a line with two end-points. This parameterization step provides two advantages over existing line- or point-based 3D reconstruction methodologies, such as those provided by prior art structure from motion algorithms, because the inventive methods are able to achieve the following.

First, a duality is created between points and lines that is preserved by: a) visual triangulation for calculating 3D coordinates of features (point and lines) and b) reprojecting 3D features into the 2D-image plane. This duality allows interchanging the role of points and lines the mathematical formulations whenever appropriate.

Second, a parameterization step facilitates modeling of lens-distortion parameters even when substantially only line level information is present. Due to deviations from rectilinear projection caused by lens distortion, straight lines in a scene are typically transformed into curves in the image of the scene. Existing line-based 3D-reconstruction algorithms assume that the input data (images or video frames) are already undistorted; this necessitates use of pre-calibrated cameras in prior-art methods. In some embodiments, substantially no such assumption is made in the present invention. As such, uncalibrated cameras are particularly suitable for use in the present invention.

Further in regards to the parameterization, the present invention allows reprojection errors to be calculated with a weighing function that substantially does not over- or under-estimate the contribution of line and/or edge points to the total reprojection error cost function.

In some embodiments, if $$l_s^d = (u_s^d, v_s^d)^T \text{ and } l_e^d = (u_e^d, v_e^d)^T$$

denote the distorted 2D coordinates of two end points of a line segment in an image, $$L_s = (X_s, Y_s, Z_s)^T \text{ and } L_e = (X_e, Y_e, Z_e)^T$$

denote their corresponding 3D points and $P^{3\times4}$ is the camera-projection matrix.

In some embodiments, an information processor that uses the present invention performs the following:

1) Calculates $$l_s^u = (u_s^u, v_s^u)^T \text{ and } l_e^u = (u_e^u, v_e^u)^T$$

which are the undistorted coordinates of the two end points.

2) Locates a 3D point on the infinite 3D line that is connecting the two end points ($P_s$) using $l_s^u$, $L_s$, $L_e$, and $P^{3\times4}$ $$a_1 = [P^{00} - P^{20} \times u_s^u \quad P^{01} - P^{21} \times u_s^u \quad P^{02} - P^{22} \times u_s^u] \begin{bmatrix} X_e - X_s \\ Y_e - Y_s \\ Z_e - Z_s \end{bmatrix}$$

$$a_2 = [P^{10} - P^{20} \times v_s^u \quad P^{11} - P^{21} \times v_s^u \quad P^{12} - P^{22} \times v_s^u] \begin{bmatrix} X_e - X_s \\ Y_e - Y_s \\ Z_e - Z_s \end{bmatrix}$$

$$b_1 = [P^{20} \times u_s^u - P^{00} \quad P^{21} \times u_s^u - P^{01} \quad P^{22} \times u_s^u - P^{02} \quad P^{23} \times u_s^u - P^{03}] \begin{bmatrix} X_s \\ Y_s \\ Z_s \\ 1 \end{bmatrix}$$

$$b_2 = [P^{20} \times v_s^u - P^{10} \quad P^{21} \times v_s^u - P^{11} \quad P^{22} \times v_s^u - P^{12} \quad P^{23} \times v_s^u - P^{13}] \begin{bmatrix} X_s \\ Y_s \\ Z_s \\ 1 \end{bmatrix}$$

$$t = \frac{a_1 \times b_1 + a_2 \times b_2}{a_1 \times a_1 + a_2 \times a_2}$$

$$P_s = \begin{bmatrix} X_s + (X_e - X_s) \times t \\ Y_s + (Y_e - Y_s) \times t \\ Z_s + (Z_e - Z_s) \times t \end{bmatrix}$$

3) Locates a 3D point on the infinite 3D line that is connecting the two end points ($P_e$) using $l_e^u$, $L_s$, $L_e$, and $P^{3\times4}$ following a similar process presented in the previous step.

4) Projects $P_s$ and $P_e$ into the 2D-image plane using $P^{3\times4}$ to get $p_s$ and $p_e$.

5) Finds $l_h$ which is a normalized homogeneous line that connects $p_s$ and $p_e$.

6) Calculates the reprojection error.

$$e = 0.5 \times (|\langle l_h, p_s \rangle| + |\langle l_h, p_e \rangle|)$$

where || represents the absolute value and ⟨ ⟩ represents the inner product.

FIG. 1A is a block diagram of a system 101 according to some embodiments of the present invention. In some embodiments, system 101 includes one or more cloud-computing servers 181 each connected to the internet 180. In some embodiments, a non-transitory computer-readable storage medium 183 has photogrammetry instructions and data structures of the present invention stored thereon. In some embodiments, the methods of the present invention execute on cloud-computing server(s) 181 using the photogrammetry instructions and data structures from computer-readable storage medium 183, wherein a user 98 uploads images from still camera 182 and/or video camera 184 into cloud-computing server(s) 181, either directly (e.g., using the cell-phone or other wireless network, or through a conventional personal computer 186 connected to the internet). In other embodiments, photogrammetry instructions and data structures of the present invention are transmitted from computer-readable storage medium 183 into local non-transitory computer-readable storage media 187 (such as rotating optical media (e.g., CDROMs or DVDs) or solid-state memory devices (such as SDHC (secure data high-capacity) FLASH devices), which are connected to, plugged into, and/or built into cameras 182 or 184 or conventional personal computers 186 to convert such devices from generic information processors into special-purpose systems that convert image data into photogrammetry data according to the present invention. In some embodiments, system 101 omits one or more of the devices shown and still executes the methods of the present invention.

Figure 1B:
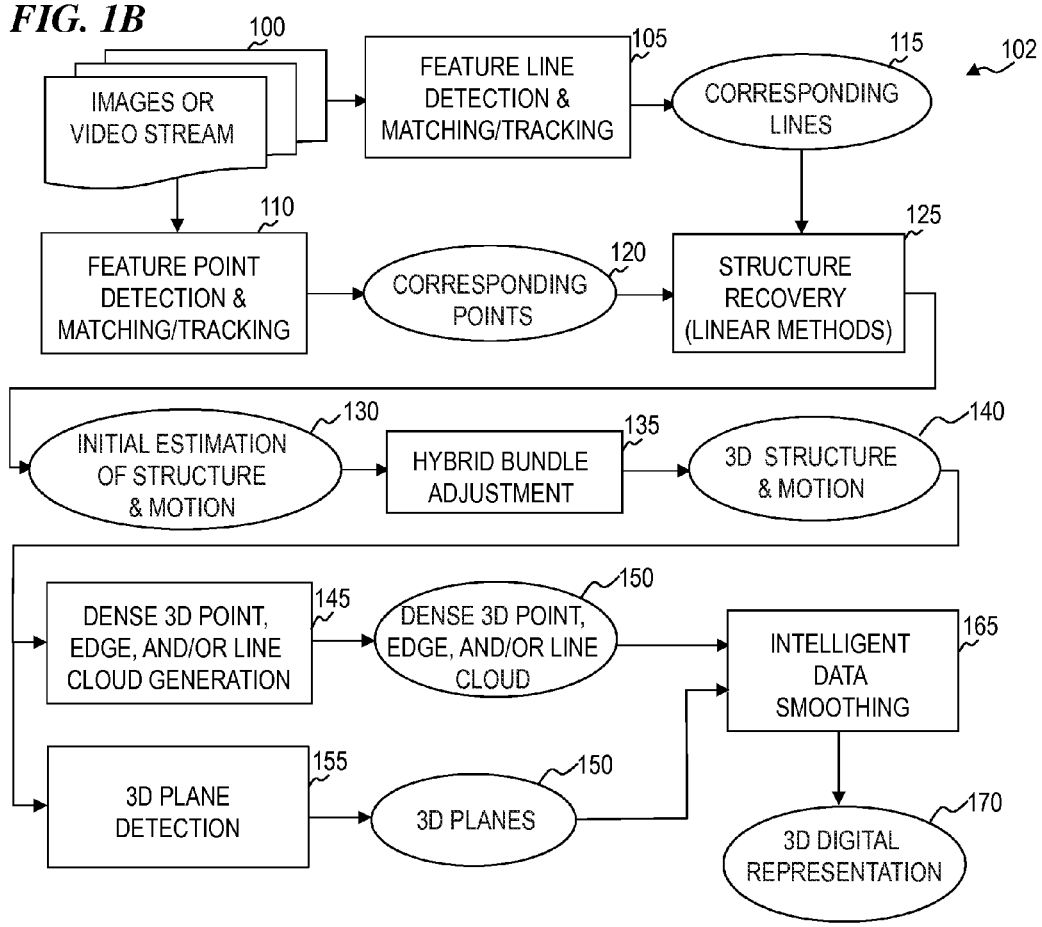
FIG. 1B is a flowchart of a method 102 illustrating an exemplary method to obtain 3D digital representations of an object of interest according to the methodology herein.

FIG. 1B presents a flowchart of a method 102 illustrating one aspect of the present invention. In FIG. 1B, FIG. 2, FIG. 3, and FIG. 4, rectangular boxes represent a function and ovals are the inputs/outputs. In block 100 a plurality of overlapping images are received by. These images can be derived from a still image-capture device 182 or a video image-capture device 184 as discussed elsewhere herein. In some embodiments, feature lines are detected and matched/tracked in block 105 and block 110, respectively. The output of the detection and matching process of block 110 and block 105 are corresponding lines of block 115 and corresponding points of block 120. In some embodiments, in block 125, methods such as linear methods, are used for structure recovery processes, such as those presented in more detail in reference to FIG. 2. In some embodiments, an initial estimation of structure and motion data in block 130 is determined based on the structure recovery of block 125. In some embodiments, hybrid bundle adjustment techniques in block 135 are used to further refine/optimize the 3D structure and motion data 140 and are used in process 145 to generate a 3D point, line and/or edge cloud 150 representative of the at least one object of interest. In some embodiments, 3D structure and motion data 140 are used in a 3D plane detection process 155 to detect 3D planes 160. In some embodiments, the 3D point, line and/or edge cloud of block 150 and 3D plane of block 160 are included in intelligent data smoothing in block 165 to generate a 3D digital representation of block 170 incorporating the at least one object of interest.

Figure 2:
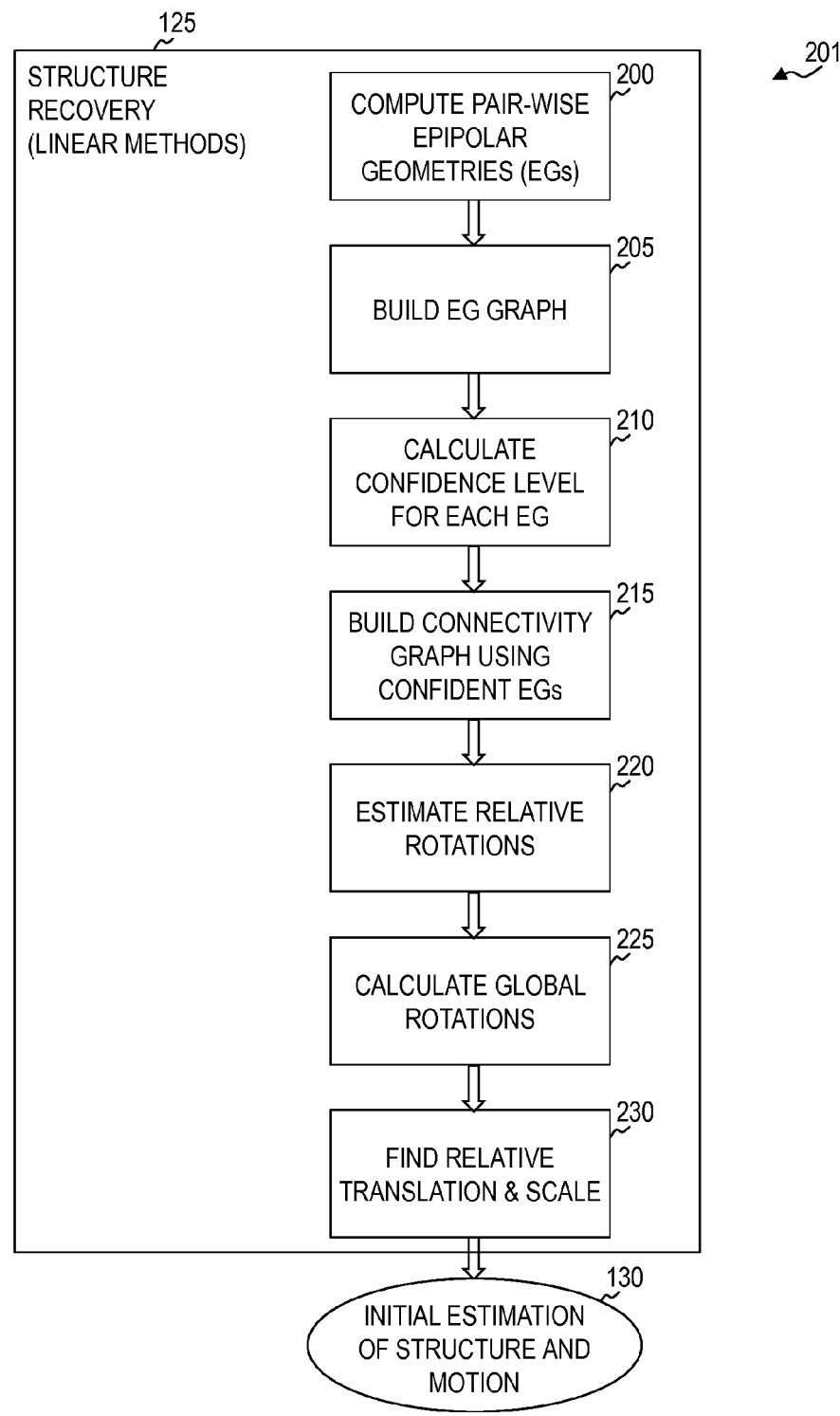
FIG. 2 is a flowchart of a method 201 illustrating an exemplary method to perform the structure-recovery portion 125 of the process of FIG. 1.

FIG. 2 is a flowchart of a method 201 illustrating an exemplary method to perform the structure-recovery portion 125 of the process of FIG. 1B. In comparison to previous methodologies using passive image-capture devices, in some aspects, the present invention provides notable benefits relating to the ability to utilize a single image capture device to generate the plurality of overlapping images. In this regard, FIG. 2 illustrates such benefits in relation to structure recovery of block 125 called out from FIG. 1. In block 200 pairwise epipolar geometries are computed, and used in block 205 to build a graph of epipolar geometries. In some embodiments, from the data from which the graph of block 205 is created, the confidence level for each epipolar geometry is calculated in 210. Where the calculated epipolar geometries are determined to meet the desired confidence level (such as 90% or 95% or 99% confidence level), a connectivity graph is built in block 215. In block 220, the relative rotations of the various points on the connectivity graph of block 215 are estimated, followed by calculation of global rotations in block 225. In block 230, the relative translation and scaling factor for the resulting data is determined, whereby the data generated in method 201 of FIG. 2 is used to provide an initial estimation of structure and motion 130 for further application to the process set out in FIG. 1.

Further in regard to block 225 wherein the initial estimate of the relative rotation for each pair of images or video frames (those which resulted in confident epipolar geometries) are estimated, in some embodiments, the global rotation for each view is calculated by the following methodology:

1) Build matrix A (wherein A is a (3m)×(3m) matrix and m is the total number of images or video frames)
If the relative rotation between view i and j is denoted by $R_{ij}$, then

--- for int i = 0; i < m − j++{
for int j = i + 1; j < m; j++{

$$A \mathrel{+}= \begin{bmatrix} \ldots & \ldots & \ldots & \ldots & \ldots & \ldots & \ldots & \ldots & \ldots \\ \ldots & 1 & 0 & 0 & \ldots & -R_{ij}^{00} & -R_{ij}^{01} & -R_{ij}^{02} & \ldots \\ \ldots & 0 & 1 & 0 & \ldots & -R_{ij}^{10} & -R_{ij}^{11} & -R_{ij}^{12} & \ldots \\ \ldots & 0 & 0 & 1 & \ldots & -R_{ij}^{20} & -R_{ij}^{21} & -R_{ij}^{22} & \ldots \\ \ldots & \ldots & \ldots & \ldots & \ldots & \ldots & \ldots & \ldots & \ldots \end{bmatrix}$$

as an example to clarify matrix indices: $A_{3i,3i} = 1$ and $A_{3j,3j} = -R_{ij}^{00}$
}
}

---

2) Singular Value Decomposition (SVD) of A
$$A = U\Sigma V^*$$

With regard to block 230 where the global rotation is calculated, the following methodology is used.

1) Calculate global rotation for view i from V* matrix $$V^* = \begin{bmatrix} \ldots & \ldots & \ldots & \ldots & \ldots \\ \ldots & v_{3i+0,3m-3} & v_{3i+1,3m-3} & v_{3i+2,3m-3} & \ldots \\ \ldots & v_{3i+0,3m-2} & v_{3i+1,3m-2} & v_{3i+2,3m-2} & \ldots \\ \ldots & v_{3i+0,3m-1} & v_{3i+1,3m-1} & v_{3i+2,3m-1} & \ldots \end{bmatrix}$$

$$R_i = \begin{bmatrix} v_{3i+0,3m-1} & v_{3i+1,3m-1} & v_{3i+2,3m-1} \\ v_{3i+0,3m-2} & v_{3i+1,3m-2} & v_{3i+2,3m-2} \\ v_{3i+0,3m-3} & v_{3i+1,3m-3} & v_{3i+2,3m-3} \end{bmatrix}$$

2) Find the closest orthogonal matrix to $R_i$.

Once the scale ambiguity of, for example, a 3D point cloud is resolved, the spatial distance between each point pair in the point cloud will represent the distance between the corresponding physical points in the actual scene. In some embodiments, this is leveraged to extract a wide variety of dimensions and measurements from the point cloud. In some embodiments, the obtained knowledge about corner points, edge/boundary points, blobs, ridges, straight lines, curved boundaries, planar surfaces, curved surfaces, and other primitive geometry elements can provide the capability to identify significant parts of the scene and automatically extract corresponding measurements (length, area, volume, etc.). In some embodiments, the 2D locations of these primitive geometries are first detected in images or video frames. The image-based coordinates are then converted into 3D coordinates via the calculated camera matrices.

As mentioned, the present invention provides accurate 3D digital representations of at least one object in a scene. In one aspect, the level of accuracy of the 3D digital representations of the object(s) of interest is with reference to one or more of the actual dimensions of the object of interest. In this regard, at least one object of interest is identified, selected or otherwise specified, where the identification, etc., can include identification of at least one dimension of interest in the object, or such identification, etc., may include a plurality of dimensions of interest where each of these dimensions, independently, includes an actual value. As discussed elsewhere herein, the identification, etc., of the at least one object of interest and/or the one or more dimensions in the object(s) can be by either or both of a computer or a user.

In some embodiments, the accuracy of the measurements obtained according to the invention herein can be characterized in relation to a specified number of pixels. The methodology herein allows a user to obtain measurements of one or more dimensions of the object of interest of up to and including a 1.0 pixel standard deviation or, in other embodiments, a 0.5 pixel standard deviation is provided. As would be recognized, pixel size is an aspect of the image-capture device specifications and the distance of the image-capture device from the object of interest. This is illustrated in Table 2 hereinbelow.

In some embodiments, accuracy in pixels relative to the actual dimensions of the object of interest is represented according to the following formula:

Pixel size in object=(distance of object of interest from IC device)*(IC device sensor size)/((IC device resolution*IC device focal length))

The IC ("image capture") device sensor size, resolution and focal length are features or characteristics of each image-capture device. For example, the below Table 1 sets out some representative specifications for existing image-capture devices:

TABLE 1

| | Image-Capture Device Specifications | | |
|---|---|---|---|
| | focal Length (mm) | sensor (mm) | Resolution (pixels) |
| iPhone 5s (Apple) | 4.12 | 4.80 | 1920 |
| GoPro H3 (GoPro) | 21 (Medium Field of View) | 6.17 | 1920 |

The calculations in Table 2 (and Table 3) assume that there is no scaling error. As would be recognized, scaling error will decrease the accuracy of the measurement derived from the image-capture device vs. the actual measurement of the one or more dimensions of the object of interest.

TABLE 2

| US | | Metric | | Pixel size | |
|---|---|---|---|---|---|
| | 0.5 Std dev | | 0.5 Std dev | Pixel size | Pixel size in image |
| Distance object to camera (ft) | in object measurements (in) | Distance object to camera (m) | in object measurements (cm) | in image at distance (mm) | at distance (in) |
| iPhone 5s | | | | | |
| 15 | 0.05 | 4.6 | 0.14 | 2.77 | 0.11 |
| 30 | 0.11 | 9.1 | 0.28 | 5.55 | 0.22 |
| 60 | 0.22 | 18.3 | 0.55 | 11.10 | 0.44 |
| 120 | 0.44 | 36.6 | 1.11 | 22.19 | 0.87 |
| 240 | 0.87 | 73.1 | 2.22 | 44.39 | 1.75 |
| 480 | 1.75 | 146.3 | 4.44 | 88.77 | 3.49 |
| 960 | 3.49 | 292.6 | 8.88 | 177.54 | 6.99 |
| 1920 | 6.99 | 585.2 | 17.75 | 355.09 | 13.98 |
| GoPro H3 | | | | | |
| 15 | 0.01 | 4.6 | 0.03 | 0.70 | 0.03 |
| 30 | 0.03 | 9.1 | 0.07 | 1.40 | 0.06 |
| 60 | 0.06 | 18.3 | 0.14 | 2.80 | 0.11 |
| 120 | 0.11 | 36.6 | 0.28 | 5.60 | 0.22 |
| 240 | 0.22 | 73.1 | 0.56 | 11.19 | 0.44 |

TABLE 2-continued

| US | | Metric | | Pixel size | |
|---|---|---|---|---|---|
| | 0.5 Std dev | | 0.5 Std dev | Pixel size | Pixel size in image |
| Distance object to camera (ft) | in object measurements (in) | Distance object to camera (m) | in object measurements (cm) | in image at distance (mm) | at distance (in) |
| 480 | 0.44 | 146.3 | 1.12 | 22.39 | 0.88 |
| 960 | 0.88 | 292.6 | 2.24 | 44.77 | 1.76 |
| 1920 | 1.76 | 585.2 | 4.48 | 89.55 | 3.53 |

It should also be noted that the stated pixel errors are in relation to the general capabilities of image-capture devices available in the market currently. In the future, image-capture devices will be available with higher resolutions that will allow attendant improvements in the accuracy of the inventive methods. Such higher-resolution devices will provide sharper (e.g., less blurred) and less noisy images which will, in turn, result in less pixelization effect and hence the pixel noise will be decreased to allow smaller pixel errors. Still further, improvements in image-capture devices will result in reduced lens distortion and improvements in the squareness of pixels (i.e., without skews). Improvements in image sensors, as well as other relevant sensors, will also be obtained. Prospective improvements include, but are not limited to, higher focal length and smaller sensor size. Any such improvements individually or in combination will result in attendant improvements in the data available from 2D images and, therefore more accurate measurements will be obtainable using the methodologies herein. Such improved image-capture devices and the resulting data therefrom are contemplated for use with the inventive methods.

In some embodiments, accuracy of the measurements derived from the image-capture device is also represented in percent error. The methodology herein enables measurements to be derived from the image-capture device having accuracy within, in some embodiments, about 5% or in other embodiments, about 10% or in still other embodiments, about 20% error relative to the actual measurement value of the object of interest. In some embodiments, this error is calculated from the following formula:

Error %=(((distance of object from IC device)/2)* object size)*((IC device sensor size)/(IC resolution*IC device focal length)*100%)

Representative % error calculations are presented in Table 3

TABLE 3

| | US | | | Metric | | | Accuracy | | | Camera Info | |
|---|---|---|---|---|---|---|---|---|---|---|---|
| Distance object to camera (ft) | Size of Smallest Object with <5.0% err (in) | Maximum pixel offset for object this size and 5.0% err (in) | Distance object to camera (m) | Size of Smallest Object with <5.0% err (cm) | Maximum pixel offset for object this size and 5.0% err (cm) | "Fabrication Level" Maximum Pixel Offset (5% error) | "Estimation Level" Maximum Pixel Offset (20% error) | Ratio of "Distance object to Camera"/ "Size of Smallest" | Focal Length (mm) | Sensor size (mm) | Resolution (pixels) |
| | | | | | iPhone 5s | | | | | | |
| 15 | 1.1 | 0.05 | 4.6 | 0.3 | 0.01 | 0.05" | 0.22" | 165 | 4.12 | 4.80 | 1920 |
| 30 | 2.2 | 0.11 | 9.1 | 0.6 | 0.03 | 0.11" | 0.44" | 165 | 4.12 | 4.80 | 1920 |
| 60 | 1.1 | 0.22 | 18.3 | 1.1 | 0.06 | 0.22" | 0.87" | 165 | 1.12 | 1.80 | 1920 |
| 120 | 8.7 | 0.44 | 36.6 | 2.2 | 0.11 | 0.44" | 1.75" | 165 | 4.12 | 4.80 | 1920 |
| 240 | 17.5 | 0.87 | 73.1 | 4.4 | 0.22 | 0.87" | 3.50" | 165 | 4.12 | 4.80 | 1920 |
| 480 | 35.0 | 1.75 | 146.3 | 8.9 | 0.44 | 1.75" | 6.99" | 165 | 4.12 | 4.80 | 1920 |
| 960 | 69.9 | 3.50 | 292.6 | 17.8 | 0.89 | 3.50" | 13.98" | 165 | 4.12 | 4.80 | 1920 |
| 1920 | 139.8 | 6.99 | 585.2 | 35.5 | 1.78 | 6.99" | 27.96" | 165 | 4.12 | 4.80 | 1920 |
| | | | | | GoProH3 | | | | | | |
| 15 | 0.3 | 0.01 | 4.6 | 0.1 | 0.00 | 0.01" | 0.06" | 653 | 21 | 6.17 | 1920 |
| 30 | 0.6 | 0.03 | 9.1 | 0.1 | 0.01 | 0.03" | 0.1" | 653 | 21 | 6.17 | 1920 |
| 60 | 1.1 | 0.06 | 18.3 | 0.3 | 0.01 | 0.06" | 0.2" | 653 | 21 | 6.17 | 1920 |
| 120 | 2.2 | 0.11 | 36.6 | 0.6 | 0.03 | 0.11" | 0.4" | 653 | 21 | 6.17 | 1920 |
| 240 | 4.4 | 0.22 | 73.1 | 1.1 | 0.06 | 0.22" | 0.9" | 653 | 21 | 6.17 | 1920 |
| 480 | 8.8 | 0.44 | 146.3 | 2.2 | 0.11 | 0.44" | 1.8" | 653 | 21 | 6.17 | 1920 |
| 960 | 17.6 | 0.88 | 292.6 | 4.5 | 0.22 | 0.88" | 3.5" | 653 | 21 | 6.17 | 1920 |
| 1920 | 35.3 | 1.76 | 585.2 | 9.0 | 0.45 | 1.76" | 7.1" | 653 | 21 | 6.17 | 1920 |

From Table 3, it is apparent that error in the measurement will be relative to the size of the object of interest (or specific dimensions of interest within the object), with the measurement derived for smaller objects being more accurate relative to the actual dimensions of the object when the image-capture device is closer to the object.

As an example of measurement accuracy attainable with the inventive methodology herein, an "estimation level of accuracy" may be appropriate when only approximate measurements are required to determine the amount of materials needed for a project. In some embodiments, such "estimation levels of accuracy" are equal to or less than about 20%, or in other embodiments, about 15% or in yet other embodiments, about 10% or more than about 5% of the actual dimensions of the at least one object of interest. To illustrate, an extracted measurement value of the at least one object of interest that is one-hundred ten (110) inches (279.4 cm) is within an "estimation level of accuracy" when the actual measurement of the at least one object of interest is 100 inches (254 cm), such that the error is 10%. Situations where such "estimation level of accuracy" would be valuable, for example, are to estimate the materials needed to for carpet, wallpaper, paint, sod, roofing and the like.

In some circumstances, a better than "estimation level of accuracy" will be appropriate. Such cases will call for a "fabrication level of accuracy." In some embodiments, such "fabrication level of accuracy" means that the extracted measurement value is less than about 5%, or in other embodiments, less than about 3% or in still other embodiments, less than about 2% or less than about 1% of the actual dimensions of the at least one object of interest. Situations where such "fabrication level of accuracy" would be appropriate include, for example, measurements used to manufacture custom cabinets, off-site preparation of construction details (trim), identification of exact dimensions of componentry (e.g., space available for appliances, BIM) and the like.

In some embodiments, software associated with the methods and devices of the present invention is configured to provide information regarding the error in the measurement presented. For example, in some embodiments, when the measurement of an object is reported to the user as 10 feet (3.048 meters) along one dimension, information about any error in such measurement pixel accuracy or % error is provided as set out elsewhere herein.

In a further aspect, in some embodiments, the 3D digital representations of the at least one object of interest are derived from the plurality of overlapping 2D images incorporating the object(s) substantially without need for manual steps to extract measurements, such as by providing manual manipulation to extract the data necessary to generate the 3D digital representations. Still further, in some embodiments, the measurements can be obtained substantially without need for a separate scaling step, such as that required to obtain measurements of objects with the Photomodeler product, for example.

In one embodiment, an image-capture device can be integrated into a mobile device to allow images of the at least one object of interest to be obtained. Software either included in or associated with the mobile device can be suitably configured to allow the 2D-image processing, data generation, generation of the 3D digital representation of the object(s) to substantially occur on the mobile device using software and hardware associated with the device. Such software, etc., can also be configured to present to the user a measurement of one or more dimensions of the object of interest or to store such measurement for use.

In one aspect, measurements of the at least one object of interest can be obtained using a marker as a reference. For example, a ruler or other standard sized object can be incorporated in a scene that includes the at least one object of interest. Using the known dimensions of the marker, one or more dimensions of the object can be derived using known methods.

In another aspect, measurements of the at least one object of interest can be obtained without use of, or in addition to, a marker. In this regard, the invention utilizes an internal or "intrinsic" reference. With this intrinsic reference, the invention herein allows a user to generate substantially accurate measurements of the at least one object of interest. In particular, such substantially accurate measurements are provided, in some aspects, by incorporation of the intrinsic reference into the software instructions associated with the image-capture device and/or any hardware into which the device is associated. In separate aspects, the intrinsic reference comprises one or more of: i) dimensions generated from at least two focal lengths associated with the image-capture device; ii) a library of standard object sizes incorporated in software provided to the image-capture device; iii) user identification of a reference object in a scene that contains the at least one object of interest; and iv) data from which measurements of the at least one object of interest can be derived, wherein such measurement data is generated from a combination of inertial sensors associated with the image-capture device, where the sensors provide data comprising: (a) an acceleration value from an accelerometer associated with the image-capture device; and (b) an orientation value provided by a gyroscopic sensor present the image-capture device.

With regard to an intrinsic reference derived from the focal length of the image-capture device most existing image-capture devices (e.g., cameras) comprise a short depth of field, resulting in images which appear focused only on a small 3D slice of the scene. Such features can be utilized in the present invention to allow estimation of the depth or 3D surface of an object of interest from a set of two or more images incorporating that object. These images can be obtained from substantially the same point of view while the image-capture device parameters (e.g., the focal length) are modified. Using this technique, the amount of blur in captured images can be used to provide an estimation of the object depth where such depth can be used to derive measurements of one or more dimensions of interest of the object.

In a further aspect of the intrinsic reference feature of the present invention, a library of standard object identities and sizes can be included in the software associated with the image-capture device to provide data from which measurement data for the at least one object of interest can be derived. For example, the size of one or more objects can serve as a reference when that object appears in the same scene as the at least one object of interest. For example, if a single toggle light switchplate, which has a standard US size of 4.5 inches (11.42 cm) in height and 2.75 inches (6.985 cm) in width, appears in a scene with an object of interest, the known standard dimensions of this switchplate can be used as an intrinsic reference to provide a point of reference from which the dimensions of the object of interest can be derived. In some aspects, the user can identify the intrinsic reference object manually or object recognition methodologies can be used to automatically process the dimension data. The reference object used as the intrinsic reference can be generated from a database of digital photographic and/or video images that are likely to occur in a given environment, for example. In another aspect, a database of common objects present in a construction or contractor setting can be included in software configurations directed toward such users. Items related to household furnishings can be included in software configurations directed toward interior decorators. More broadly, the database may include photographic and/or video images of structures within some general use or location.

In a third aspect, the intrinsic reference can be provided by user identification of an object of interest that can serve as a reference. In this regard, the software associated with the image-capture device and/or the hardware into which the image-capture device is integrated can be configured to allow the user to select an object in the scene to serve as a reference, such as by way a user interface. The user can measure the reference object directly and input the measured value or he can select from a library of standard objects as discussed previously where such database is associated with the software of the present invention. For example, if the identified reference object that will serve as the intrinsic reference for providing measurement of an object of interest present in the scene is a switchplate cover, the system 101 will elicit and receive the specification of an object to be used for dimensional calibration, and the user will select the switchplate cover to serve as the intrinsic reference. The user can then measure the dimensions of the switchplate cover and input the dimensions into the appropriate fields in the user interface when that information is elicited. Calculations of the dimensions of the object of interest will then be provided using the methodology set out elsewhere herein. Alternatively, in some embodiments, in response to the system eliciting an object to be used for dimensional calibration, the user selects the switchplate cover as a reference object and the standard dimensions of a switchplate cover are obtained from a library of standard object sizes incorporated within the software associated with the image-capture device, thereby allowing the measurements of an object of interest to be obtained as set out elsewhere herein.

In a further aspect, the intrinsic reference can be provided by sensor data obtained from inertial sensors associated with the image-capture device. In some embodiments, calculating the image-capture device displacement between two images/frames allows resolution of scale ambiguity. In some embodiments, the image-capture device displacement is extracted from data that inertial sensors (e.g., accelerometer and gyroscope) in the image-capture device. In particular, a gyroscope measures orientation based on the principles of angular momentum. An accelerometer, on the other hand, measures gravitational and non-gravitational acceleration. In some embodiments, integration of inertial data generated by movement of the image-capture device over time provides data regarding displacement that, in turn, is utilized to generate measurements of one or more dimensions of the object of interest using known methods.

In some embodiments, image-capture device-specific data is obtained by system 101 to provide more accurate measurement of the at least one object of interest. To achieve such accuracy, the actual image-capture device specifications such as, for example, focal length, lens distortion parameter and principal point are determined through a calibration process. In certain embodiments, a self-calibration function is performed without image-capture device details, which can occur when such details are not stored. In this regard, software associated with the image-capture device can suitably estimate information needed to provide measurements of the at least one object of interest. In some embodiments, self-calibration of the camera is conducted using the epipolar geometry concept. Epipolar geometry between each image pair can provide us an estimated value of the focal length. The collection of these estimations is used in a prediction model to predict an optimum focal length value.

The methods, systems, devices, and software aspects of the invention can be carried out on a wide variety of devices that can generally be categorized by the term "image-capture device." As used herein, such image-capture devices in use today are integrated into mobile devices such as "smartphones," mobile telephones, "tablets," "wearable devices" (such as where a camera may be embedded or incorporated into clothing, eyeglasses or functional jewelry, etc.), laptop computers, unmanned aerial vehicles (UAVs; e.g., drones, robots), etc. Still further, the image-capture devices 182 and 184 (see FIG. 1A) can be associated (such as by being in communication with) desktop computers 186 and cloud-based computers 181. It is contemplated by the inventors herein that innovations in image-capture devices will be introduced in the future. Such image-capture devices are included in the present invention if these devices can be configured to incorporate the inventive methods herein.

In various aspects of the invention, all or some portion of the processes claimed herein can be carried out on a portable device that includes suitable processing capability. In recent years, there has been a proliferation of smartphones. Exemplary operating systems/smartphones are IOS/iPhone®, Android®/Samsung Galaxy® and Windows®/Windows Phone®). As would be recognized, smartphones are wireless, compact, hand-held devices that, in addition to basic cellular telephone functions, include a range of compact hardware. Typical smartphones have embedded (or "native") digital cameras that include both video and static image-acquisition capabilities, large touchscreen displays, and broadband or Wi-Fi capabilities allowing for the receipt and transmission of large amounts of data to and from the Internet. More recently, tablet computers and wearable devices have emerged that provide, in pertinent part, many of the functionalities of smartphones, including image capture and processing capabilities and WiFi and cellular capabilities.

Smartphones, tablets and wearable devices not only include a range of hardware, they are also configured to download and run a wide variety of software applications, commonly called "apps." The proliferation of mobile devices, with their combination of portable hardware and readily loaded software applications, creates a platform upon which many aspects of the invention may be practiced.

In certain aspects, the invention advantageously utilizes basic features of smartphones, tablets, and wearable devices, and extends the capabilities of these devices to include accurate and convenient measurement of one or more objects of interest by using the image-capture devices native on such devices. In further aspects, the processes described herein may convert a common smartphone, tablet, wearable device, standalone camera or the like into a measurement tool, medical device or research tool, for example. Such aspects will benefit users by extending the functionality of these devices.

While use of multi-function smartphones, tablets, wearable devices, or the like that incorporate image-capture devices suitably allow implementation of the methodology herein, devices that include less functionality, such as "standalone" digital cameras or video cameras, are also used in some embodiments. Such image-capture devices generally include WiFi and/or cellular capabilities, as well as "apps" so as to provide networked functionality. Accordingly, such image-capture devices can suitably be utilized in accordance with one or more of the inventions herein. One example of a standalone digital camera that can be used is the GoPro® H3.

In a further example, the methods herein can be performed on a single-purpose device. For example, an image-capture device intended for use by professionals who work with exterior and interior building spaces (e.g., architects, contractors, interior designers, etc.) can be configured with hardware and software suitable to allow the users to obtain measurements that they can use in their respective professional responsibilities. One example of such implementations is detailed in the co-assigned U.S. Provisional Patent Application No. 62/165,995 filed May 24, 2015 entitled "Interior Survey Devices and Methods," the disclosure of which is incorporated by reference in its entirety.

The methods herein can also be provided in the form of an application specific integrated circuit ("ASIC") that is customized for the particular uses set out herein. Such ASIC can be integrated into suitable hardware according to known methods to provide a device configured to operate the methods herein.

Still further, the present invention relates to mobile devices and the like that are configurable to provide substantially accurate measurements of at least one object of interest, where such measurements are derived from a 3D digital representation of the object of interest obtained according to the methodology herein. In one aspect, for example, the dimensions of a roof can be obtained using a single video camera that includes passive image-capture capability, such as that embedded in a mobile device, thereby eliminating the need to send a person to the location to measure the size of the roof to provide an estimate. Yet further, the dimensions of a kitchen (or, more broadly, any room or interior of a structure) can be obtained using the passive image-acquisition and processing methods herein thereby allowing cabinets or the like to be sized accurately without the need to send an estimator to the customer's home. Yet further, accurate dimensions of a floor area can be provided using measurement derived from distances from wall to wall in a room so as to provide an estimate of the amount of materials needed for a flooring project. As would be recognized, the ability to obtain accurate measurement of locations such as roofs, kitchens, flooring and other locations would provide significant benefits to contractors who currently must first visit a location to obtain substantially accurate measurements prior to being able to provide a close estimation of the cost of a construction job. Such applications are described in the co-assigned U.S. Provisional Application No. 62/165,995, previously incorporated herein.

In a further aspect, in some embodiments, the devices and methods herein are used to provide substantially accurate measurements and characteristics of a person's body so as to allow custom clothing to be prepared for him or her without the need to visit a tailor. In some embodiments, such accurate body measurement are used to facilitate telemedicine applications.

Yet further, in some embodiments, the invention herein provides accurate measurement of wound size and other characteristics present on a human or an animal. Accordingly, the present invention further relates to medical devices configured with image-capture devices and associated software that provide the disclosed benefits and features.

In further embodiments, the accurate 3D digital representations of the object(s) can be used create accurate 3D models of the object of interest, where such 3D models can be generated using 3D printing devices, etc.

In some embodiments, the methodology herein is utilized in conjunction with navigation utilized for robots, unmanned autonomous vehicles and the like where such navigation utilizes image-capture devices therein. In one example, the present invention can be incorporated with Simultaneous Localization And Mapping ("SLAM"). As would be recognized, SLAM is a method that used in robotic navigation where a robot or autonomous vehicle estimates its location relative to its environment, while simultaneously avoiding any dangerous obstacles. The autonomous vehicle makes observations of surrounding landmarks from poses obtained from one or more image-capture devices associated with the vehicle and probabilistic methods are used to achieve maximum likelihood estimation of the camera trajectory and 3D structure. Although many research efforts have been undertaken on this topic in the robotics and computer-vision communities, at this time no conventional methodology can suitably provide a substantially accurate dense 3D mapping of large-scale environments because the focus of existing methodologies is primarily directed towards accurate estimation of camera trajectory.

Figure 3:
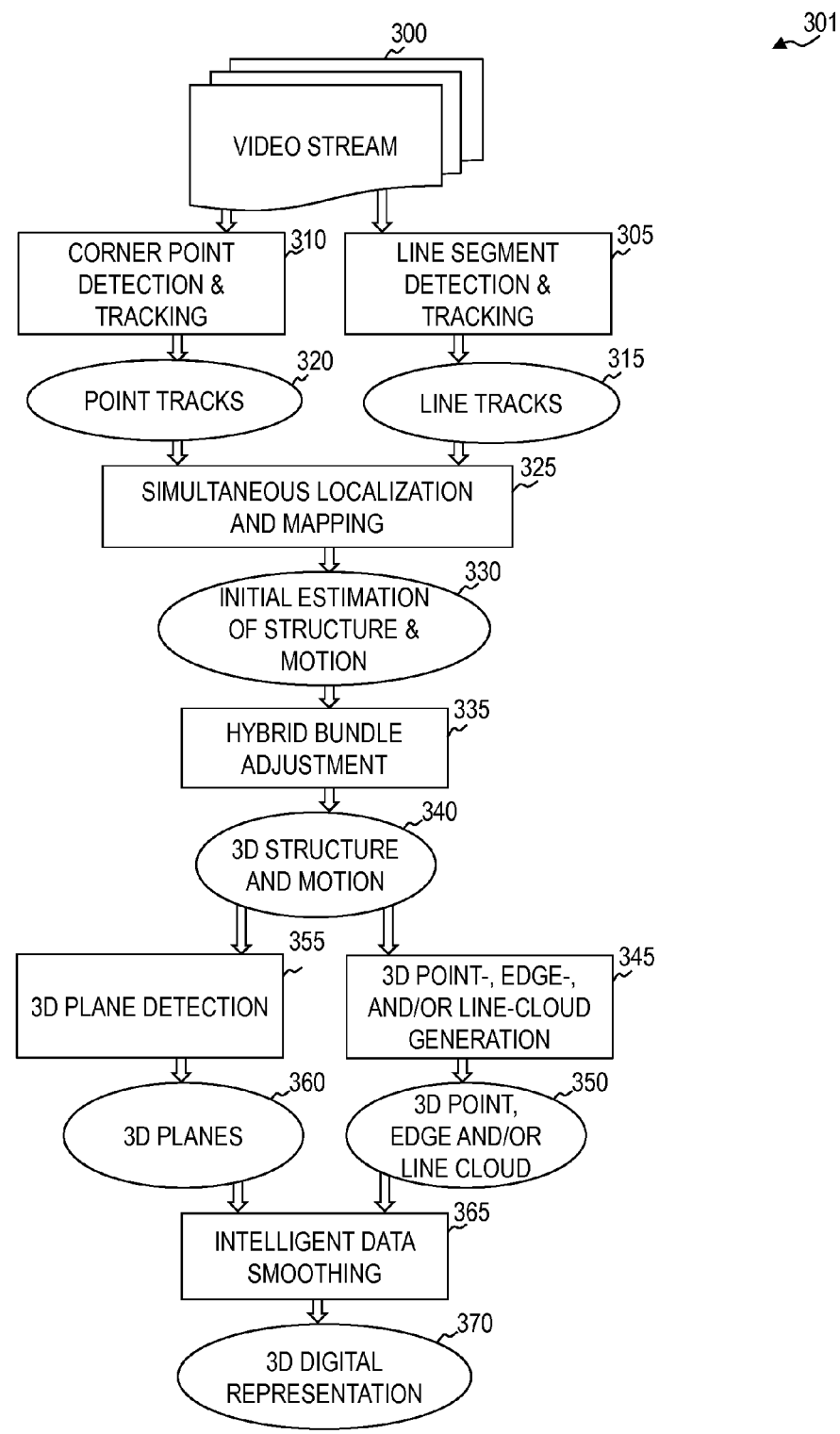

Referring to FIG. 3 and with regard to use of the methodology herein with robotic navigation and the like, a video stream 300 is provided to method 301. These images can be derived from a video image-capture device (such as camera 184 of FIG. 1A) as discussed elsewhere herein. In some embodiments, line segments and corner points are detected and tracked in block 305 and block 310, respectively, of method 301. The output of the detection and matching process of block 305 and block 310 includes corresponding line tracks 315 and corresponding point tracks 320. In block 325 SLAM is conducted as set out in more detail in the description of FIG. 4. In some embodiments, an initial estimation of structure and motion data resulting from block 325 is determined based on the recovered structure data in block 330. In some embodiments, hybrid bundle-adjustment techniques 335 are used to further refine/optimize the 3D structure and motion data 340 and are used, in some embodiments, in process 345 to generate a 3D point, line and/or edge cloud 350 representative of the at least one object of interest. In some embodiments, 3D structure and motion data 340 are used in a 3D plane detection process 355 to detect 3D planes 360. In some embodiments, the 3D point, line and/or edge cloud 350 and 3D planes 360 are included in intelligent data smoothing in 365 to generate a 3D digital representation 370 incorporating the at least one object of interest.

Figure 4:
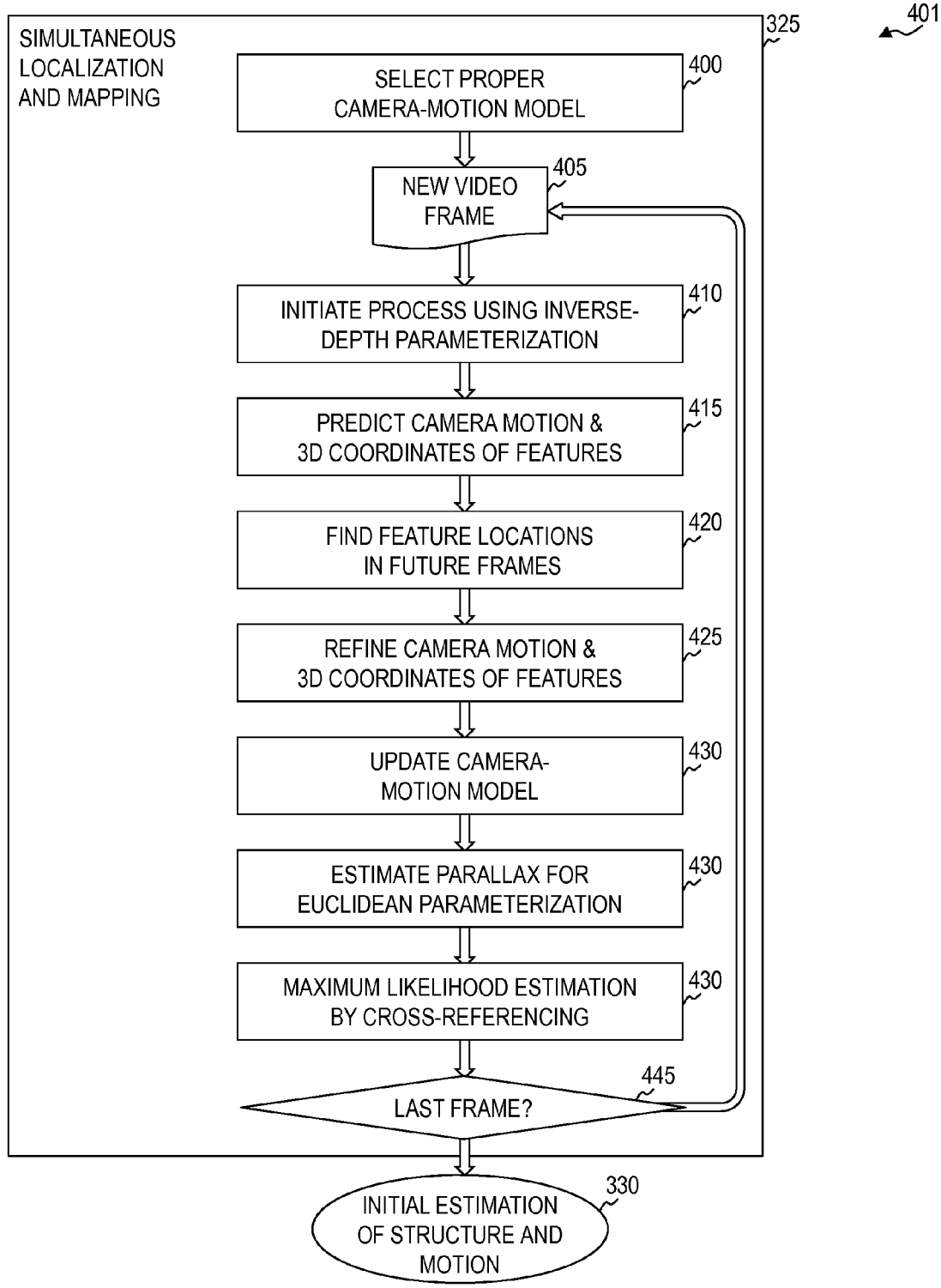
FIG. 4 is a flowchart of a method 401 illustrating an exemplary method to perform a simultaneous-localization-and-mapping (SLAM) portion 325 of method 301 of FIG. 3.

Referring to FIG. 4, in some embodiments, SLAM 325 of FIG. 3 is implemented using method 401. In some embodiments, a proper image-capture device (e.g., camera) motion model 400 is initially identified. In some embodiments, such selection is as simple as a model that represents constant (or substantially constant) directional and angular velocity, or in other embodiments, it is more complex. Once the motion model is identified in block 400, video frames 405 are read one by one. For each new video frame 405, an initial estimation of the camera pose is calculated according to predictions from the camera motion model selected in block 400. Previously detected features are tracked according to visibility constraints and new features are detected, if necessary. In block 410, each new feature is parameterized using inverse depth. The feature-tracking information combined with the predicted motion in block 415 to allow determination of future locations in block 420. Once these locations are determined, in block 425 the predicted camera pose and 3D structure are refined based on the new observations. These observations are also used to update the camera motion model in block 430. A parallax is calculated for each feature in block 435 according to the updated parameters and if a suitable parallax is observed, the Euclidean representation is used to replace inverse depth parameterization. A semi global optimization is then applied based on the visibility information to find the maximum likelihood estimation of the camera poses and 3D structure in block 440. This process is repeated until all video frames are determined by block 445 to have been processed, and method 401 provides the initial estimation of structure and motion of block 330 (referring again to FIG. 3).

In conjunction with the methods herein, in some embodiments, the software associated with the image-capture device and/or the hardware into which the image-capture device is integrated is configured to provide the user with interactive feedback with regard to the image-acquisition parameters. For example, in some embodiments, such interactive feedback provides information regarding the object of interest including whether the tracking is suitable to obtain a plurality of overlapping 2D images necessary to provide suitable images from which 3D digital representations of the object(s) of interest can be generated to provide substantially accurate measurements or other useful information relating to the object. In some embodiments, such processing is conducted in the image-capture device itself (e.g., device 182 or device 184 of FIG. 1A) or the hardware in which the device is integrated (e.g., smartphone, wearable device, etc.). In other embodiments, the processing is performed "in the cloud" on a server 181 that is in communication with the image-capture device/hardware. In other embodiments, the processing is performed on any device (e.g., device 186 of FIG. 1A) in communication with the image-capture device and/or hardware. In some embodiments, such processing is performed on both the device/hardware and an associated server, where decision-making regarding the location of various parts of the processing may depend on the speed and quality that the user needs results. Yet further, in some embodiments, user feedback is provided in real time, in near real time or on a delayed basis.

Yet further, in some embodiments, the user display of the 3D digital representation thereof is configured to provide user generated inputs to facilitate generation of the plurality of overlapping 2D images of the at least one object of interest, the 3D digital representations of the object(s) of interest and/or the extracted measurement values. In some embodiments, such user generated inputs include, for example, the level of detail, a close-up of a portion of the point cloud/image, optional colorization, a desirable level dimension detail, etc.

In a further aspect, the software associated with the image-capture devices and methods herein is configured to provide an accuracy value for the 3D digital representations of the object(s). By reporting a level of accuracy (where such accuracy is derivable as set out elsewhere herein), a user will obtain knowledge about accuracy of the extracted measurement or other dimensional value of the at least one object of interest.

In some embodiments, the software associated with the image-capture devices and/or hardware in which the image-capture device is integrated is configured to elicit and receive from the user a selection of a region/area of interest in a captured image(s) of the object of interest. For example, in some embodiments, when a scene in which an object of interest is captured, the software elicits and receives selection of a specific object appearing in the scene. In an exemplary configuration of such an implementation, the scene presented to the user through a viewfinder or screen on the image-capture device elicits and receives the selection of an object present in the scene such as by touch or other type of method. The object of interest can be identified or selected by a computer or a user. In some embodiments, the identified object is then analyzed in accordance with the methods herein so as to provide an accurate 3D digital representation of the object(s).

In some embodiments, the methods of the present invention are suitable for use, and are performed, "in the cloud" (i.e., the software executes on server computers connected to the internet and leased on an as-needed basis). (Note that the word "cloud" as used in the terms "point cloud" described as part of the invention is independent of, and unrelated to, "cloud computing" as such.) As would be recognized, cloud computing has emerged as one optimization of traditional data processing methodologies. A computing cloud is defined as a set of resources (e.g., processing, storage, or other resources) available through a network that can serve at least some traditional datacenter functions for an enterprise. A computing cloud often involves a layer of abstraction such that the applications and users of the computing cloud may not know the specific hardware that the applications are running on, where the hardware is located, and so forth. This allows the computing cloud operator some additional freedom in terms of implementing resources into and out of service, maintenance, and so on. Computing clouds may include public computing clouds, such as Microsoft® Azure, Amazon® Web Services, and others, as well as private computing clouds.

Communication media appropriate for use in or with the inventions of the present invention may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present invention are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In some embodiments, the present invention provides a method for generating a 3D digital representation of an object of interest. This method includes: a) receiving a plurality of 2D digital images of a scene, wherein: the scene includes i) at least one object of interest, wherein the object of interest has a plurality of dimensions; ii) at least a portion of the plurality of the 2D digital images of the scene are overlapping with regard to the at least one object of interest; and iii) the plurality of 2D digital images are generated from a single passive image-capture device; and b) processing at least a portion of the plurality of overlapping 2D digital images that includes the at least one object of interest using a 3D reconstruction process that incorporates a structure from motion algorithm, thereby generating a 3D digital representation of the at least one object of interest, wherein measurements of one or more of the plurality of dimensions of the at least one object of interest are obtainable from the 3D digital representation.

In some embodiments, the present invention provides a method for generating a 3D digital representation of an object of interest. This method includes: receiving a plurality of 2D digital images of a scene, wherein: i) the scene includes at least one object of interest, wherein the object of interest has a plurality of dimensions; ii) at least a portion of the plurality of the 2D digital images of the scene are overlapping with regard to the at least one object of interest; and iii) the plurality of 2D digital images are generated from a single passive image-capture device. The method also includes processing at least a portion of the plurality of overlapping 2D digital images that includes the at least one object of interest using a 3D reconstruction process that incorporates a structure from motion algorithm, thereby generating a 3D digital representation of the at least one object of interest; and calculating measurements of one or more of the plurality of dimensions of the at least one object of interest from the 3D digital representation. Some embodiments further include displaying the 3D digital representation of the at least one object of interest. Some embodiments further include calculating the plurality of dimension measurements of the at least one object of interest from the 3D digital representation. In some embodiments, the single passive image-capture device is a video camera.

Some embodiments further include generating at least one of a 3D model, a 3D point cloud, a 3D line cloud, and a 3D edge cloud from the 3D digital representation, wherein each, independently, includes at least one of the plurality of dimensions of the at least one object of interest. In some embodiments, the measurements are obtainable substantially without a separate scaling step.

Some embodiments further include selecting one or more of the plurality of dimensions in the at least one object of interest, wherein each of the selected dimensions, independently, includes an actual measurement value; extracting measurement data from the selected dimensions; and processing the extracted measurement data to provide an extracted measurement value for each selected dimension.

In some embodiments, at least one of the selection steps is automatically performed by a computer. In some embodiments, either or both of the selection steps is elicited and received by a computer from a user. In some such embodiments, a pixel accuracy of each extracted measurement value, independently, is represented in pixel units according to the following formula:

((distance of object of interest from image-capture device)*(image capture device sensor size))/ ((image-capture device resolution*image-capture device focal length))

wherein "*" represents multiplication and "/" represents division.

In some such embodiments, the pixel accuracy of each extracted measurement value is about one pixel.

In some embodiments, each extracted measurement value of each selected dimension is, independently, within about 5% of each corresponding actual measurement value.

Some embodiments further include generating boundary information for the at least one object of interest.

In some embodiments, the present invention provides a computerized method of obtaining at least one measurement of an object of interest, This computerized method includes: a) receiving a plurality of 2D images of a scene from a single passive image-capture device, wherein the plurality of 2D images includes image data of at least one object of interest present in the scene, and at least a portion of the plurality of 2D images of the scene are at least partially overlapping with regard to the at least one object of interest, thereby providing a plurality of overlapping 2D images that includes the at least one object of interest; b) generating, by the computer, a 3D representation of the at least one object of interest, wherein the 3D digital representation is obtained from at least a portion of the 2D digital images incorporating the object using a process incorporating a structure from motion algorithm; c) eliciting and receiving selections, made by either or both the computer or the user, of one or more dimensions of interest in the at least one object of interest, wherein each dimension, independently, comprises an actual measurement value; d) extracting data, by the computer, from the 3D digital representation, wherein the extracted data comprises measurement data comprising information corresponding to each identified dimension; and e) processing, by the computer, the extracted measurement data to provide an extracted measurement value for each selected dimension.

In some embodiments, an accuracy of each extracted measurement value, independently, is represented in pixels according to formula:

((distance of object of interest from image-capture device)*(image-capture device sensor size))/ ((image-capture device resolution*image-capture device focal length)).

In some embodiments, a pixel accuracy of each extracted measurement value is about one pixel.

In some embodiments, the plurality of 2D images includes video images.

Some embodiments further include generating boundary information for the at least one object of interest.

In some embodiments, the present invention provides a computerized method of boundary detection. In some embodiments, this method includes: a) receiving a plurality of 2D digital images of a scene, wherein: i) the scene includes at least one object of interest having a plurality of boundaries; ii) at least a portion of the plurality of 2D digital images is overlapping with regard to the at least one object of interest; iii) the plurality of 2D digital images are generated from single passive image-capture device; and b) processing at least a portion of the plurality of overlapping 2D digital images that include the at least one object of interest using a method that incorporates a structure from motion algorithm, thereby providing detected boundary information for at least a portion of the at least one object of interest, wherein the detected boundary information can be represented as at least one of: a 3D digital representation, a 3D model, a 3D point cloud, a 3D line cloud, and a 3D edge cloud, each corresponding to at least a portion of the at least one object of interest. In some such embodiments, the single passive image-capture device is a video camera. In some embodiments, the measurements of at least a portion of the at least one object of interest are obtainable from the detected boundary information.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for generating a 3D digital representation of an object of interest, the method comprising:
   a) receiving, into a computer, a plurality of 2D digital images of a scene, wherein:
      i) the scene includes at least one object of interest, wherein the at least one object of interest has a plurality of dimensions;
      ii) at least a portion of the plurality of the 2D digital images of the scene are overlapping with regard to the at least one object of interest; and
      iii) the plurality of 2D digital images are generated from a single passive image-capture device;
   b) processing, by the computer, at least a portion of the plurality of overlapping 2D digital images that includes the at least one object of interest using a 3D reconstruction process that incorporates a structure from motion algorithm, thereby generating a 3D digital representation of the at least one object of interest;
   c) obtaining, using the computer, measurements of at least one of the plurality of dimensions of the at least one object of interest from the 3D digital representation;
   d) selecting at least one dimension of the plurality of dimensions of the at least one object of interest, wherein each of the selected at least one dimension, independently, comprises an actual measurement value;
   e) extracting measurement data from the selected at least one dimension; and
   f) processing the extracted measurement data to provide an extracted measurement value for each of the selected at least one dimension.

2. The method of claim 1, wherein the single passive image-capture device is a video camera.

3. The method of claim 1, further comprising:
   using the 3D digital representation for generating at least one of a 3D model, a 3D point cloud, a 3D line cloud, and a 3D edge cloud, wherein each, independently, comprises at least one of the plurality of dimensions of the at least one object of interest.

4. The method of claim 1, wherein the obtaining of the measurements is performed without a separate scaling operation.

5. The method of claim 1, wherein the selecting of the at least one dimension of the plurality of dimensions is performed automatically by a computer.

6. The method of claim 1, wherein the selecting of the at least one dimension of the plurality of dimensions includes eliciting and receiving into the computer, information that specifies the at least one dimension of the plurality of dimensions from a user.

7. The method of claim 1, wherein a pixel accuracy of each extracted measurement value, independently, is represented in pixel units according to formula:

$$((\text{distance of object of interest from image-capture device})*(\text{image capture device sensor size}))/((\text{image-capture device resolution}*\text{image-capture device focal length})).$$

8. The method of claim 7, wherein the pixel accuracy of each extracted measurement value is about one pixel.

9. The method of claim 1, wherein each value of the extracted measurement data of each selected dimension is, independently, within 5% of each corresponding actual measurement value.

10. The method of claim 1, further comprising generating boundary information for the at least one object of interest.

11. A computerized method of obtaining at least one measurement of an object of interest comprising:
    a) receiving a plurality of 2D images of a scene from a single passive image-capture device, wherein the plurality of 2D images includes image data of at least one object of interest present in the scene, and at least a portion of the plurality of 2D images of the scene are at least partially overlapping with regard to the at least one object of interest, thereby providing a plurality of overlapping 2D images that includes the at least one object of interest;
    b) generating, by the computer, a 3D representation of the at least one object of interest, wherein the 3D digital representation is obtained from at least a portion of the 2D digital images incorporating the at least one object using a process incorporating a structure from motion algorithm;

c) selecting, by either or both the computer or the user, one or more dimensions of interest in the at least one object of interest, wherein each selected dimension, independently, comprises an actual measurement value;

d) extracting data, by the computer, from the 3D digital representation, wherein the extracted data comprises measurement data comprising information corresponding to each selected dimension; and e) processing, by the computer, the extracted measurement data to provide an extracted measurement value for each selected dimension.

12. The method of claim 11, wherein an accuracy of each extracted measurement value, independently, is represented in pixels according to formula:

((distance of object of interest from image-capture device)*(image-capture device sensor size))/((image-capture device resolution*image-capture device focal length)).

13. The method of claim 12, wherein a pixel accuracy of each extracted measurement value is about one pixel.

14. The method of claim 11, wherein the plurality of 2D images are video images.

15. The method of claim 11, further comprising generating boundary information for the at least one object of interest.

16. The method of claim 1, wherein the single passive image-capture device is not a stereo image-capture device.

17. The method of claim 11, wherein the single passive image-capture device is not a stereo image-capture device.

* * * * *